No. 623,322. Patented Apr. 18, 1899.
J. P. LAVIGNE.
TURRET LATHE.
(Application filed Feb. 21, 1898.)
(No Model.) 4 Sheets—Sheet 1.
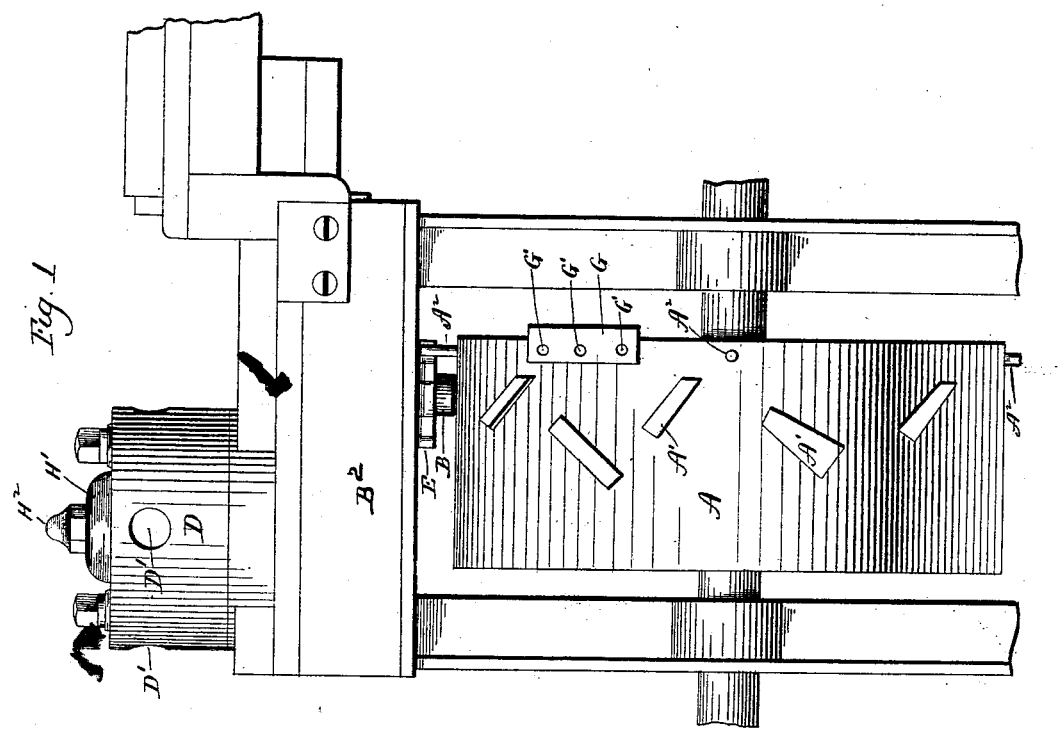

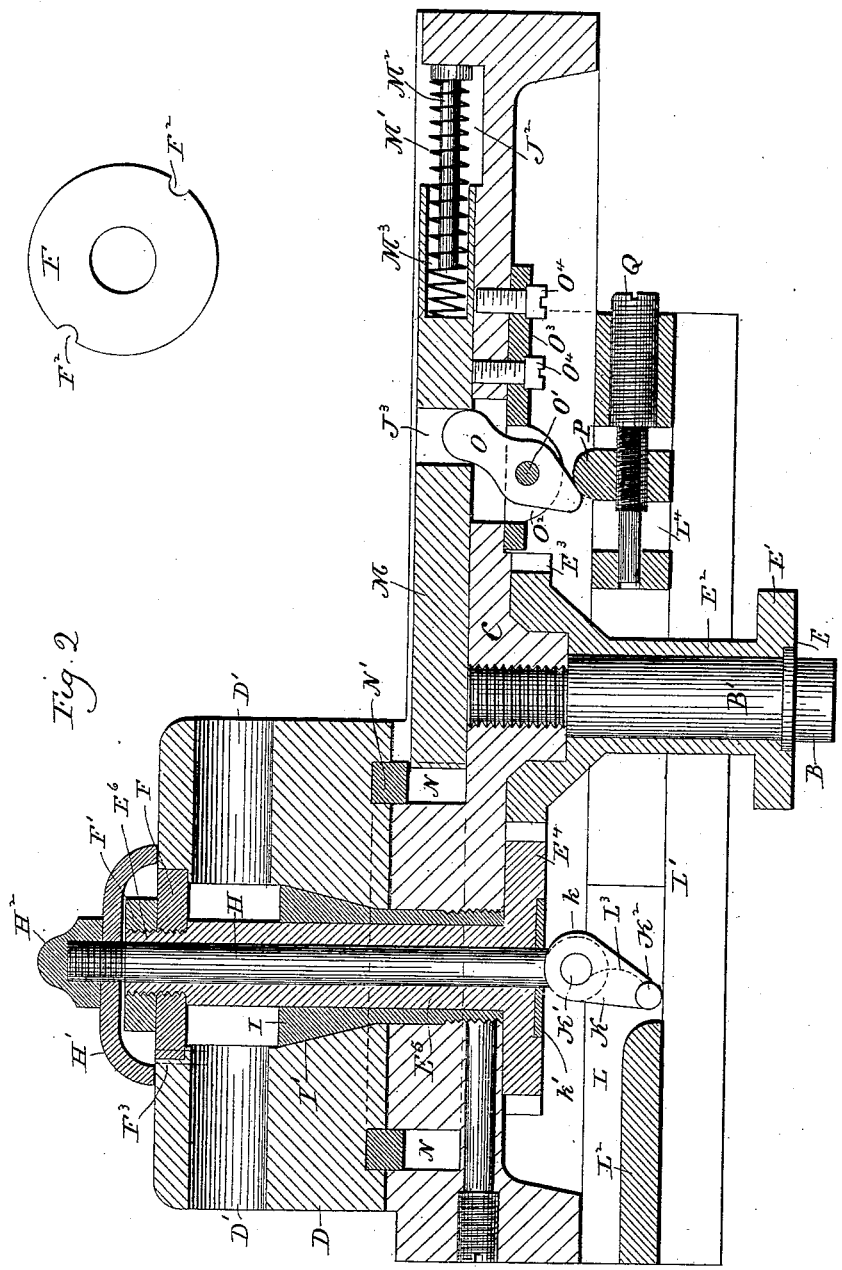

No. 623,322. Patented Apr. 18, 1899.
J. P. LAVIGNE.
TURRET LATHE.
(Application filed Feb. 21, 1898.)
(No Model.) 4 Sheets—Sheet 3.
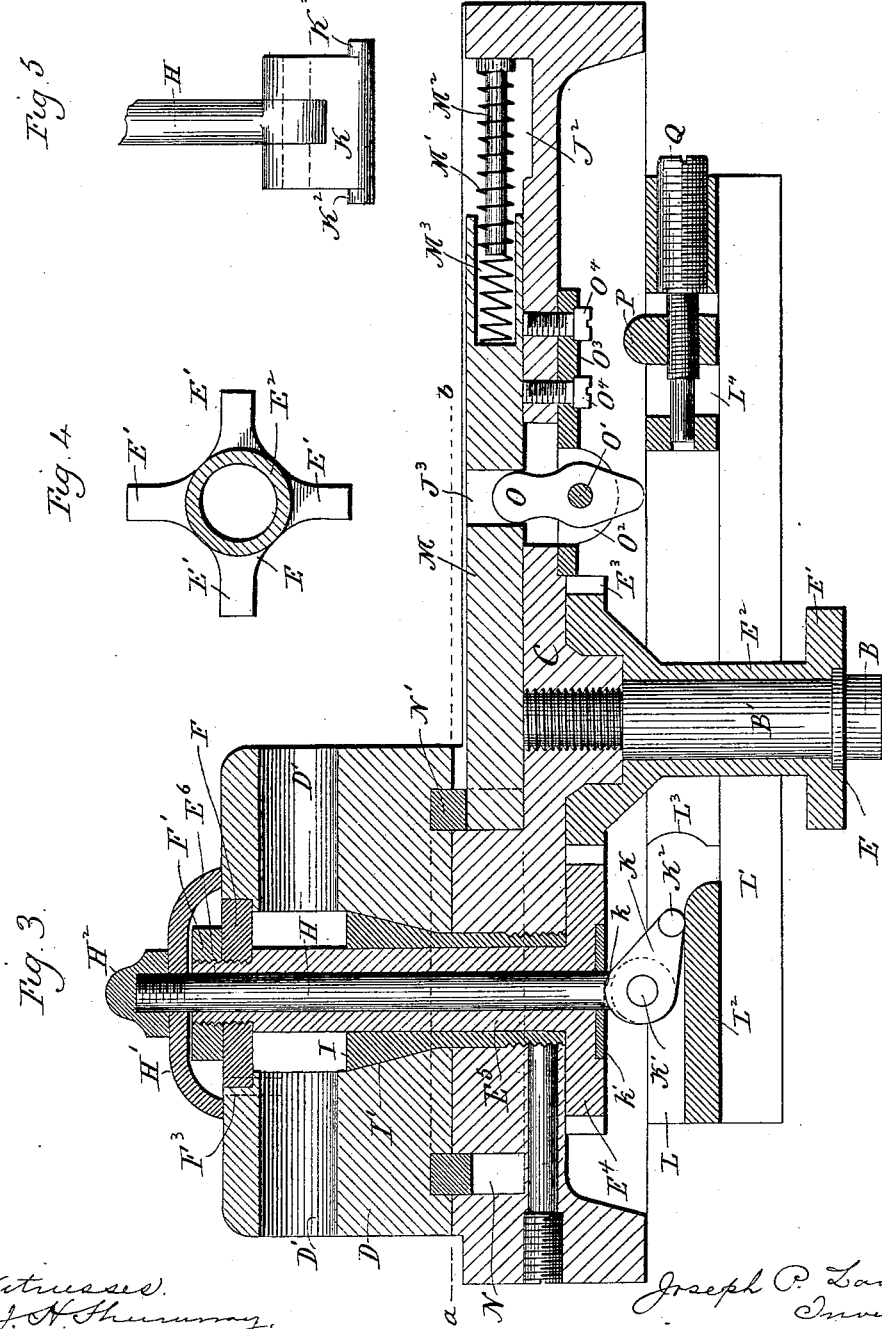

No. 623,322. Patented Apr. 18, 1899.
J. P. LAVIGNE.
TURRET LATHE.
(Application filed Feb. 21, 1898.)
(No Model.) 4 Sheets—Sheet 4.
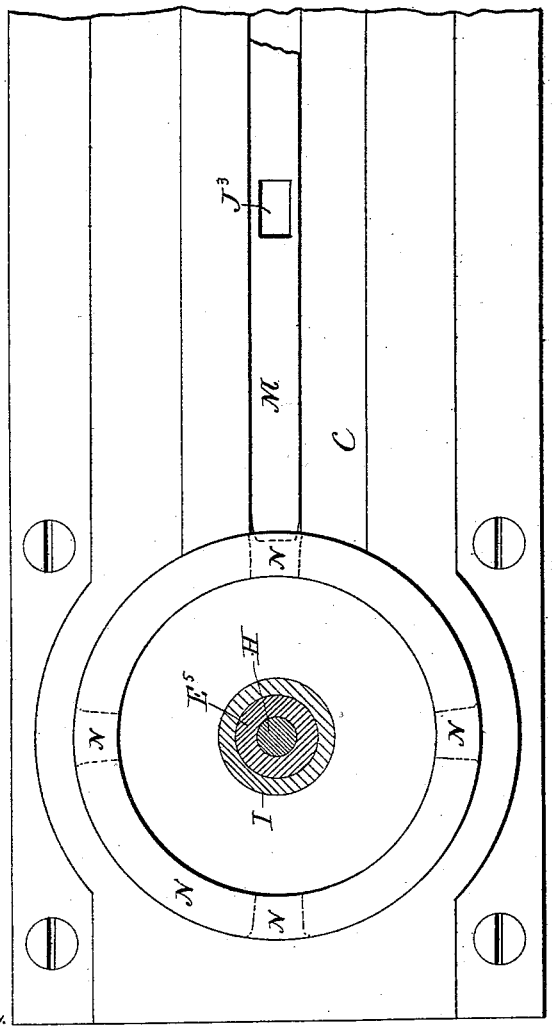
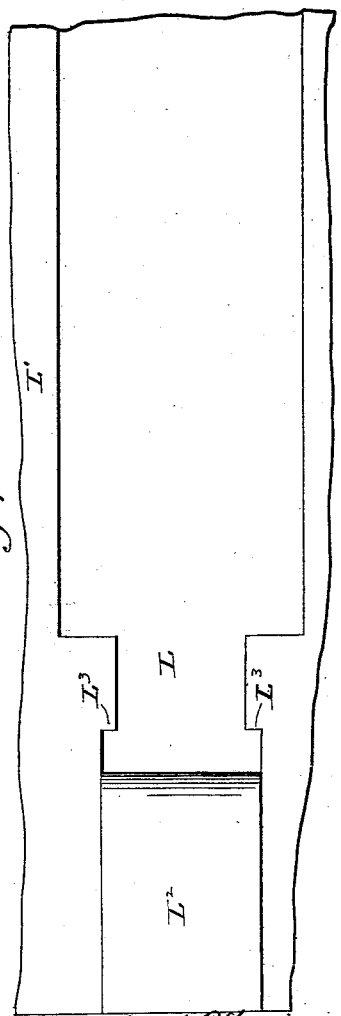

UNITED STATES PATENT OFFICE.

JOSEPH P. LAVIGNE, OF NEW HAVEN, CONNECTICUT, ASSIGNOR TO THE LAVIGNE AUTOMATIC MANUFACTURING COMPANY, OF PATERSON, NEW JERSEY.

TURRET-LATHE.

SPECIFICATION forming part of Letters Patent No. 623,322, dated April 18, 1899.

Application filed February 21, 1898. Serial No. 671,033. (No model.)

*To all whom it may concern:*

Be it known that I, JOSEPH P. LAVIGNE, of New Haven, in the county of New Haven and State of Connecticut, have invented a new Improvement in Turret-Lathes; and I do hereby declare the following, when taken in connection with the accompanying drawings and the letters of reference marked thereon, to be a full, clear, and exact description of the same, and which said drawings constitute part of this specification, and represent, in—

Figure 1, a broken view, in side elevation, of the rear end of a turret-lathe containing my improvement; Fig. 2, a view in vertical longitudinal section through the turret, the turret-slide, and turret-slide holder, showing the instrumentalities employed for rotating the turret, for frictionally clamping it in its operating positions, and for actuating the locking-bar by which it is positively locked in those positions; Fig. 3, a similar view showing the turret clamped and locked; Fig. 4, a detached plan view of the star-wheel by means of which rotary movement is communicated to the turret; Fig. 5, a detached view, in side elevation, of the clamping-cam by means of which the turret is frictionally clamped in its operating positions; Fig. 6, a view, partly in plan and partly in horizontal section, on the line $a\ b$ of Fig. 3; Fig. 7, a broken plan view of the slide-holder designed in particular to show the recess formed therein for coaction with the clamping-cam; Fig. 8, a detached plan view of the coupling-washer.

My invention relates to an improvement in the turret-lathe which was made the subject-matter of Letters Patent of the United States granted to me July 18, 1898, No. 607,693, the object of my present invention being to simplify and improve the device disclosed in my said application.

With these ends in view my invention consists in certain details of construction and combinations of parts, as will be hereinafter described, and pointed out in the claims.

In carrying out my invention I employ a large cam-drum A, provided upon its periphery with a suitable number of adjustable cams A', designed to coact with an antifriction-roll B, located upon the lower end of a heavy operating-stud B', the upper end of which is reduced in diameter and threaded and entered into the slide C, upon which the turret D is mounted and which carries the various instrumentalities coacting therewith. The action of the cams A upon the roll B provides for the reciprocation of the slide and hence the turret back and forth upon the bed $B^2$ of the machine.

For the rotation of the turret I provide the cam-drum A with operating-pins $A^2$, set into its outer edge and arranged far apart or in groups, according to the manner in which it is desired to have the turret rotate. It will be understood, of course, that the operating-pins $A^2$ correspond in number to the tool-receiving holes D' of the turret, which is generally formed with four of such holes. These pins coact with a star-wheel E, which will have as many operating-arms E' as the turret has holes D' and as the cam-drum has pins $A^2$. This star-wheel is located at the lower end of a sleeve $E^2$, through which the heavy operating-stud B' passes. The upper end of the said sleeve $E^2$ is formed with a driving-pinion $E^3$, which meshes into a driven pinion $E^4$, located at the lower end of a long sleeve $E^5$, which extends upward through the turret and is reduced at its upper end and threaded to form a hub $E^6$, which receives a coupling-disk F and a check-nut F'. The said coupling-disk, Fig. 8, is formed at opposite points in its periphery with notches $F^2$, receiving the upper ends of coupling-pins $F^3\ F^3$, which are set into the upper face of the turret. It is through the medium of these pins that the coupling-disk F is connected with the turret, which is thus rotated by the pinions and star-wheel described. The character of the connection between the coupling-disk and turret, however, is such that the disk is allowed a little vertical play without breaking its connection with the turret. In the revolution of the cam-drum A the pins $A^2$ successively engage with the arms E' of the star-wheel E, which acts through the driving-pinion $E^3$ and the driven pinion $E^4$ to rotate the turret at longer or shorter intervals, according to the separation of the pins. As herein shown, each pin will cause it to be rotated through an arc of ninety degrees.

It will be understood, of course, that the number of pins A² employed in the cam-drum A will be determined by the number of tool-holes in the turret, while the distance between the pins will be regulated in accordance with the intervals which it is desired to have elapse between the presentation of the tools carried by the turret. The speed of the cam-drum will of course remain constant and the regulation of the operation of the turret will be effected, so as to reduce the loss of time to the minimum, by shifting the positions of the pins upon the drum.

It will be desirable in some cases to rotate the turret through half a turn or through three-quarters of a turn, and for this purpose I provide the cam-drum A with a movable block G, formed with three pin-holes G', in which three of the pins A² may be placed. Then this block is set in a certain relation to the remaining pin, whereby the arms of the star-wheel are engaged in rapid succession, so as to turn the turret rapidly.

For the purpose of frictionally clamping the turret very firmly in each of the positions into which it is turned through the action of the instrumentalities described I provide it with a clamping-rod H, which extends upward through the sleeve E⁵, before mentioned, the said rod being threaded at its upper end for the reception of a heavy cup-shaped clamping nut or disk H', which is held securely in place upon the rod by means of a nut H², the said nut or disk H' being adapted in diameter to engage with the upper face of the turret at points outside of the coupling-pins F³ F³, before mentioned. I may here note that the turret itself revolves upon a heavy hollow stud I, formed at its upper end with a taper I' and having its lower end threaded for being screwed into the slide C. The lower end of the said clamping-rod is furnished with a wide flat clamping-cam K, pivotally hung from a pin K', passing through the upper end of the cam and through an eye formed at the lower end of the rod, the said cam being furnished at opposite points upon its lower end with two stud-like projections K² K². This cam is located partly within a recess formed in the lower face of the slide C and partly within a recess L, formed in the slide-holder L'. Within the lower portion of the recess L, I form a wide flat horizontal stationary cam or stop L², which is, in fact, a portion of the slide-holder. The said clamping-cam is formed with a cam-face k, which works against a steel washer k', set into the lower face of the driven pinion E⁴. When the slide C is moved forward, the lower end of the clamping-cam engages with the rounded outer end of the stationary cam L² and is swung on its pin K' into the position in which it is shown in Fig. 3, whereby its cam-surface k coacts with the wearing-washer k' and draws the clamping-rod H downward, with the effect of drawing or biting the clamping nut or disk H' into the upper end of the turret, which is thus forced downward, so as to bring its lower face into solid bearing with the upper face of the slide. The turret is thus very firmly locked against the slightest swerving, the accurate performance of the tools being thereby insured. On the other hand, when the slide moves rearward or outward, carrying the turret with it, the extensions K² K² of the pivotal cam K engage with fixed vertical cams L³ L³, formed in the slide-holder, whereby the clamping-cam is turned back into the position in which it is shown in Fig. 2.

The frictional clamping or locking of the turret by the automatic action of instrumentalities just above described is supplemental to the positive locking of the turret, which is effected by means of a reciprocating locking-bar M, the forward end of which is slightly tapered to adapt it to be entered into locking notches or slots N, formed in a locking-ring N', the upper edge of which is set into the lower face of the turret, as clearly shown in Fig. 2. This locking-bar is constantly urged forward toward the turret by the action of a spiral spring M', surrounding a pin M², the forward end of the said spring and pin being inserted into a suitable socket M³, formed in the rear end of the bar, while the remaining portions of the spring and pin are located within a slot J², formed in the extreme rear end of the slide, as shown in Fig. 2. The said locking-bar is retracted against the force of the said spring by means of a retracting-dog O, hung upon a pin O', supported at its ends in the ears O² of a bracket-like plate O³, secured by screws O⁴ to the lower face of the slide. The upper end of the said dog is ball-shaped and enters a slot or opening J³, formed in the locking-bar, while the lower end of the said slide is tapered to form a nose which coacts with the rounded upper face of an operating-block P, which is located in a small chamber L⁴, formed in the slide-holder L' and mounted so as to be adjusted back and forth upon a horizontally-arranged screw Q, mounted in the said holder, as shown in Fig. 2. In the outward or rearward movement of the slide and turret the lower end of the dog engages the rounded upper face of the block P, which acts as a fulcrum for tilting the dog, whereby its upper end is thrown outward, with the effect of retracting the locking-bar M and compressing the spring M' thereof. The forward end of the locking-bar is thus virtually disengaged from the locking-ring N' of the turret. On the other hand, when the slide moves forward the locking-dog moves forward with it away from the block P, from which the dog is entirely cleared, as shown in Fig. 3, when the turret is locked by the locking-bar. The other details of construction may follow those of my said application or not, as desired, and they do not need to be described here.

It is apparent that in carrying out my invention some changes from the construction herein shown and set forth may be resorted to, and I would therefore have it understood that I do not limit myself to such construction, but hold myself at liberty to make such changes and alterations as fairly fall within the spirit of my invention. Thus, if desired, instead of employing a driven pinion and a driving-pinion for communicating the rotary movement of the star-wheel to the turret I might arrange to locate the star-wheel directly upon the lower end of the sleeve $E^3$ in place of the driven pinion, but in such case the said sleeve would be extended downward through the slide-holder L' in position to be engaged by the operating-pins carried by the cam-drum. This modification seems so obvious that I consider it unnecessary to describe it.

Having fully described my invention, what I claim as new, and desire to secure by Letters Patent, is—

1. In a turret-lathe, the combination with the turret thereof, of a slide upon which the turret is mounted, a slide-holder in which the slide is mounted, a star-wheel located below the slide-holder and connected with the turret, and a cam-drum coacting with the star-wheel for imparting intermittent rotary movement to the turret when the slide is at rest.

2. In a turret-lathe, the combination with the turret thereof, of a slide upon which the turret is mounted, a slide-holder in which the slide is mounted, a sleeve passing through the turret, means for coupling the upper end of the sleeve with the upper face of the turret, a star-wheel located below the slide-holder, means for connecting the star-wheel with the lower end of the said sleeve, and means for intermittently actuating the said star-wheel and hence the turret at a time when the slide is at rest.

3. In a turret-lathe, the combination with the turret thereof, of a slide upon which the turret is mounted and by which it is moved back and forth, a slide-holder in which the slide is mounted, a sleeve passing through the turret, means for coupling the sleeve with the turret, a driven pinion located at the lower end of the said sleeve, a driving-pinion meshing into the said driven pinion, a star-wheel located below the said slide-holder and connected with the said driving-pinion, and means coacting with the said star-wheel for imparting intermittent rotary movement thereto and hence to the turret, at a time when the slide is at rest.

4. In a turret-lathe, the combination with the turret thereof, of a slide, a turret-stud mounted in the slide and formed at its upper end with a bevel upon which the turret rotates with respect to the stud, a sleeve passing upward through the said stud, means for coupling the upper end of the sleeve with the turret, a driven pinion located at the lower end of the said sleeve, a driving-pinion meshing into the said driven pinion, a star-wheel connected with the said driving-pinion, and means for imparting intermittent actuation to the said star-wheel.

5. In a turret-lathe, the combination with the turret thereof, of a slide and a slide-holder, a sleeve passing upward through the turret and coupled therewith, a driven pinion located at the lower end of the said sleeve, a driving-pinion meshing into the said driven pinion, and located at the upper end of a sleeve which extends downward through the said slide-holder, a star-wheel located at the lower end of the sleeve last mentioned, and therefore below the said slide-holder, and means for actuating the star-wheel in intermittent rotation when the slide is at rest.

6. In a turret-lathe, the combination with the turret thereof, of a slide upon which the turret is mounted and by which it is moved back and forth, a slide-holder in which the slide is mounted, a turret-stud mounted in the slide and adapted for the rotation of the turret upon it, a sleeve passing upward through the said stud and turret, and adapted to have slight vertical movement independently thereof, means for actuating the said sleeve in intermittent rotation within the stud which is fixed, an independently-formed coupling-disk secured to the upper end of the sleeve, means for loosely coupling the said disk with the turret to permit the disk to move vertically with the said sleeve without being uncoupled from the turret, a clamping-rod extending upward through the sleeve, means for connecting the upper end of the rod with the upper face of the turret at points outside of the said coupling-disk, and means connected with the lower end of the rod which projects downward through the sleeve, for drawing the rod downward so as to clamp the turret in its working position.

7. In a turret-lathe, the combination with the turret thereof, of a slide upon which the turret is mounted, a clamping-rod passing upward through the turret, means for connecting the upper end of the said rod with the turret, a clamping-cam pivotally connected with the lower end of the said rod from which it depends so as to swing in a vertical plane, and cams or surfaces for coacting with the said clamping-cam which is brought into engagement with them as the turret is moved back and forth with the slide.

8. In a turret-lathe, the combination with the turret thereof, of a slide upon which the turrret is mounted, a clamping-rod extending upward through the turret, means for connecting the upper end of the rod with the turret, a pivotal clamping-cam suspended from the lower end of the said clamping-rod, a hardened washer rotating with the turret and located directly above the upper end of the said cam which bears against it and surfaces for coacting with the said cam as the slide moves back and forth, whereby the cam acts to draw the rod downward and automatically clamp the turret in its operating positions.

9. In a turret-lathe, the combination with the turret thereof, of a slide upon which the turret is mounted, a slide-holder, a turret-stud mounted in the said slide and adapted for the rotation of the turret upon it, a sleeve passing upward through the said stud and turret, means for coupling the upper end of the sleeve with the turret, a driven pinion located at the lower end of the said sleeve, means for imparting intermittent rotary motion to the said pinion and hence the sleeve and turret, a clamping-rod passing upward through the said sleeve, means for connecting the upper end of the said rod with the turret which is rotated under the said means, and automatic mechanism connected with the lower end of the clamping-rod for intermittently drawing the same downward so as to bring the clamping instrumentalities at its upper end into coaction with the turret for frictionally clamping the same in its operating positions.

In testimony whereof I have signed this specification in the presence of two subscribing witnesses.

JOSEPH P. LAVIGNE.

Witnesses:
FRED. C. EARLE,
J. H. SHUMWAY.